United States Patent
Watson et al.

(10) Patent No.: US 8,890,081 B2
(45) Date of Patent: Nov. 18, 2014

(54) HIGH-SENSITIVITY, HIGH-SPEED CONTINUOUS IMAGING SYSTEM

(75) Inventors: Scott A. Watson, Jemez Springs, NM (US); Howard A. Bender, III, Santa Fe, NM (US)

(73) Assignee: Los Alamos National Security, LLC., Los Alamos, NM (US)

( * ) Notice: Subject to any disclaimer, the term of this patent is extended or adjusted under 35 U.S.C. 154(b) by 294 days.

(21) Appl. No.: 13/087,314

(22) Filed: Apr. 14, 2011

(65) Prior Publication Data

US 2012/0261583 A1 Oct. 18, 2012

(51) Int. Cl.
G01T 1/24 (2006.01)
G01T 1/208 (2006.01)
H04N 5/32 (2006.01)
H04N 5/3745 (2011.01)

(52) U.S. Cl.
CPC ............... *H04N 5/32* (2013.01); *H04N 5/3745* (2013.01)
USPC ..................... 250/369; 250/370.14

(58) Field of Classification Search
USPC ............................................. 250/369, 370.14
See application file for complete search history.

(56) References Cited

U.S. PATENT DOCUMENTS

| | | | | |
|---|---|---|---|---|
| 5,528,043 A | * | 6/1996 | Spivey et al. | 250/370.09 |
| 6,362,482 B1 | * | 3/2002 | Stettner et al. | 250/370.08 |
| 7,141,812 B2 | | 11/2006 | Appleby et al. | |
| 2013/0044248 A1 | * | 2/2013 | Tumer et al. | 348/302 |

* cited by examiner

*Primary Examiner* — David Porta
*Assistant Examiner* — Kenneth J Malkowski (57) ABSTRACT

A continuous imaging system for recording low levels of light typically extending over small distances with high-frame rates and with a large number of frames is described. Photodiode pixels disposed in an array having a chosen geometry, each pixel having a dedicated amplifier, analog-to-digital convertor, and memory, provide parallel operation of the system. When combined with a plurality of scintillators responsive to a selected source of radiation, in a scintillator array, the light from each scintillator being directed to a single corresponding photodiode in close proximity or lens-coupled thereto, embodiments of the present imaging system may provide images of x-ray, gamma ray, proton, and neutron sources with high efficiency.

26 Claims, 5 Drawing Sheets

HIGH-SENSITIVITY, HIGH-SPEED CONTINUOUS IMAGING SYSTEM

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF THE INVENTION

Transient phenomena hold many secrets because mankind has been unable to capture them at critical moments in time. Stop-action pictures for moving objects require either gating the light source onto an integrating detector (stroboscopic), or gating the detection of a continuous light source (shuttered). Developments in high-speed photodiode arrays, wide-band operational amplifiers, and multiplexed, multi-MHz analog-to-digital data converters integrated onto single, low-cost chips, have made continuous imagers having $10^3$ pixels available for real-time imaging. However, at high frame rates, the available sensitivity of these detection systems can be significantly decreased.

X-ray movies of full-scale implosions are compared with calculations to certify the safety, security, and performance of the United States nuclear stockpile without nuclear testing and without compromising either the understanding of weapons or their expected performance. The X-rays are converted into visible light signals using scintillators in large mosaics of crystals, which are then viewed using high-speed cameras. Further uses for X-ray movies include basic materials science, with a focus on materials at high-dynamic pressure and the mechanisms of material failure, and high explosives and their performance parameters including equation-of-state parameters at high temperatures and pressures.

Other uses for high-speed cameras include work in the automotive industry for fuel-injection studies; the military industry for armor-penetration studies; and the aircraft industry for analyzing turbulent flows and jets.

SUMMARY OF THE INVENTION

Embodiments of the present invention overcome the disadvantages and limitations of the prior art by providing an imaging system having a high frame rate.

It is another object of embodiments of the present invention to provide an imaging system having a high frame rate and a large number of frames.

It is a further object of embodiments of the present invention to provide an imaging system having a high frame rate, a large number of frames, and high sensitivity Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the continuous imaging system, hereof, includes: a plurality of photodiodes disposed in an array having a chosen configuration, each photodiode of the plurality of photodiodes having a chosen area and generating an electrical signal responsive to light incident thereon; a plurality of amplifiers, each amplifier of the plurality of amplifiers being dedicated to one photodiode of the plurality of photodiodes for amplifying the electrical signal generated thereby; a plurality of multiplexed analog-to-digital converters, each analog-to-digital converter of the plurality of analog-to-digital converters receiving the amplified electrical signal from at least one amplifier of the plurality of amplifiers, and generating a voltage output therefrom; at least one first-in-first-out memory buffer for receiving and storing the voltage output from each analog-to-digital converter of the plurality of analog-to-digital converters; an output bus in electrical connection with the memory buffer for receiving stored voltages from the at least one memory buffer; and a memory readout for sampling the output bus and for generating an image from the voltages thereon.

In another aspect of the present invention and in accordance with its objects and purposes, the continuous imaging system, hereof, includes: a plurality of photodiodes disposed in an array having a chosen configuration, each photodiode of the plurality of photodiodes having a chosen area and generating an electrical signal responsive to visible light incident thereon; a plurality of scintillator pixels disposed in an array of scintillator pixels, each scintillator pixel of the plurality of scintillator pixels generating visible light in response to radiation incident thereon, wherein the visible light from each scintillator pixel of the plurality of scintillator pixels is incident on a corresponding photodiode in the plurality of photodiodes; a plurality of amplifiers, each amplifier of the plurality of amplifiers being dedicated to one photodiode of the plurality of photodiodes for amplifying the electrical signal generated thereby; a plurality of multiplexed analog-to-digital converters, each analog-to-digital converter of the plurality of analog-to-digital converters receiving the amplified electrical signal from at least one amplifier of the plurality of amplifiers, and generating a voltage output therefrom; at least one first-in-first-out memory buffer for receiving and storing the voltage output from each analog-to-digital converter of the plurality of analog-to-digital converters; an output bus in electrical connection with at least one memory buffer, for receiving stored voltages from the at least one memory buffer; and a memory readout for sampling the output bus and for generating an image from the voltages thereof.

Benefits and advantages of embodiments of the present invention include, but are not limited to, providing an imaging system having unlimited frame depth, thereby enabling the system to image transient events throughout their time evolution, and simultaneously providing high frame-rates and great sensitivity, thereby reducing the cost and size of typical flash sources, for generating images with high efficiency and large dynamic range for virtually any particle type including visible light, x-rays, electrons, protons, neutrons, and gamma rays, as examples.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of one pixel of an embodiment of the continuous imager of the present invention, illustrating the integration of a photodiode which receives light from a corresponding scintillator pixel proximity coupled, thereto, a transimpedance amplifier, an analog-to-digital converter, a first-in-first-out memory buffer, and an output bus, all disposed on a single chip; while

DETAILED DESCRIPTION OF THE INVENTION

Briefly, embodiments of the present invention include a continuous imaging system that is capable of recording low light levels from sub-millimeter features to features larger than 10 cm. The imaging system either lens-couples a scintillator array viewing projection geometry in an x-ray measurement, and/or magnetic lenses in a proton radiograph, as examples, or an object of interest in a visible scene to photodiodes, or proximity-couples the scintillators in an array of scintillators to individual photodiodes. As will be described hereinbelow, because embodiments of the present physical array are large, the system has large étendue. The system may have a movie-loop memory of 4,000 frames in 200 μs, as an example. Since each pixel has its own detector, amplifier, analog-to-digital converter, and memory, with thousands of channels operating in parallel, the imaging system can achieve high frame rates, a large number of frames, and sufficient sensitivity to enable diverse imaging experiments that cannot otherwise be accomplished. Furthermore, an in-line, design, where the photodiodes are shielded from damaging radiation by the thick scintillator and tungsten matrix in front of them, allows images of visible light x-rays, gamma rays, protons, and neutron sources to be recorded with high efficiency.

Embodiments of the present invention may be used with both lenses and proximity-coupled scintillators. In the case of lenses, the concept of étendue, to be described hereinbelow, applies directly. A lens is placed between the entire photodiode array and either a scintillator (for situations involving radiation), or an object of interest such as a spark plug. In the former case, selected imaged objects were about 15 cm on a side, while in the latter case, the chosen object was 3-4 mm on a side. Such dimensions should not be considered to be unique or limiting, but rather representative of the range of scales readily accessible to embodiments of the present imaging system. Several basic configurations for the present apparatus are anticipated: (1) Radiation source (any ionizing type), object, scintillator, lens, photodiode array; (2) Radiation source (visible), object, lens, photodiode array; (3) Radiating object (visible), lens, photodiode array; (4) Radiation source (any ionizing type), object, scintillator, photodiode array; (5) Radiating object (any ionizing type), pinhole, scintillator, photodiode array; and (6) Radiation source (visible), object, photodiode array, where the first three configurations involve at least one lens.

In high-speed imaging, the camera becomes less sensitive at increasing speeds since at high frame rates, there is less time to collect photons in each frame and the light signal in each frame becomes weaker relative to quantum and electronic noise. Consequently, photographic "speed" (sensitivity) is generally inversely related to physical "speed" (frame rate). By contrast, embodiments of the present invention simultaneously provide both high photographic speed and high physical speed without compromising either.

The present invention permits nuclear weapon certification without nuclear testing by taking x-ray movies of full-scale mock explosions used to verify calculations; enables material equations of state, fusion plasmas, discharge formation, shock physics, and fracture mechanics to be investigated; improves the range of experiments in Schlieren photography, x-ray fluoroscopy, neutron radiography, proton radiography, and visible-light photography; and records detailed movies of detonating improvised explosive devices and facilitates ballistic studies, as examples.

Figure 1A:
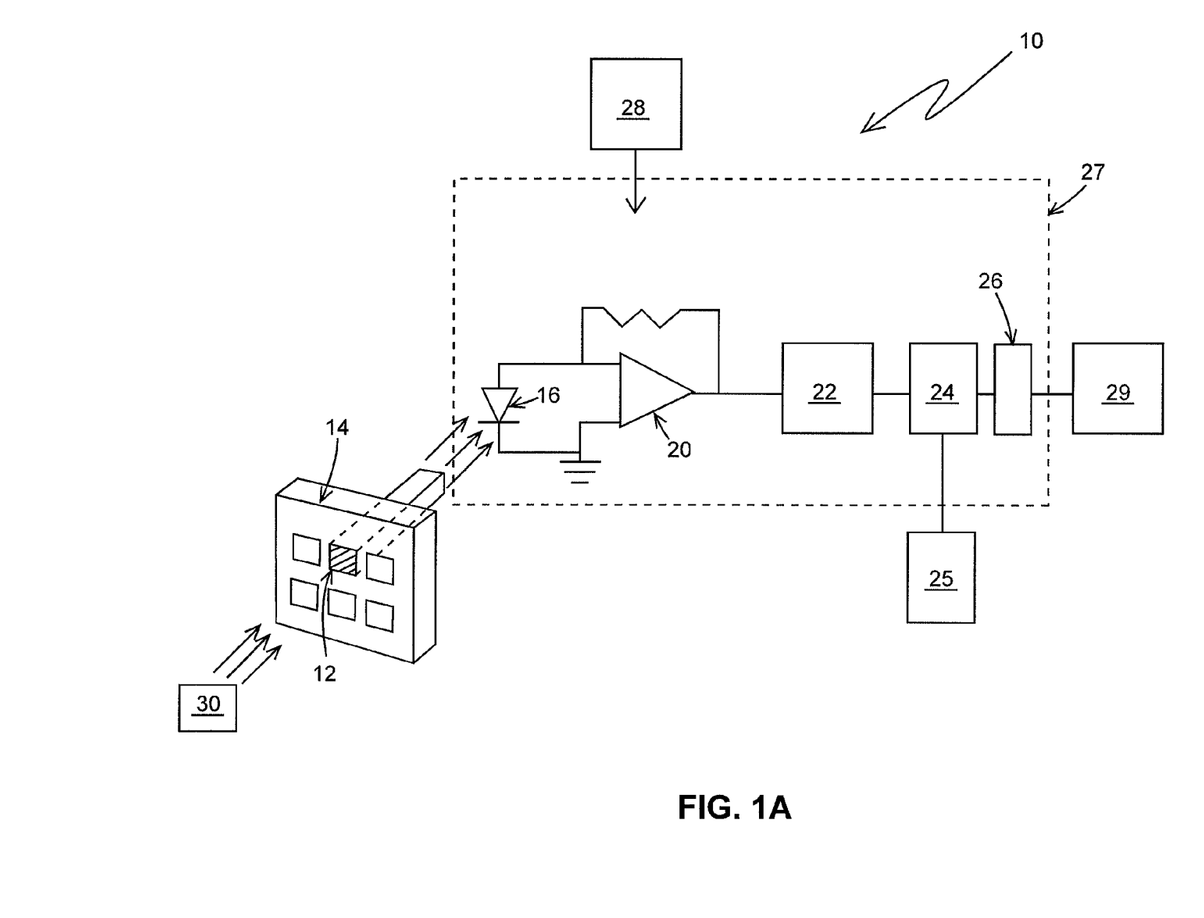
Figure 1B:
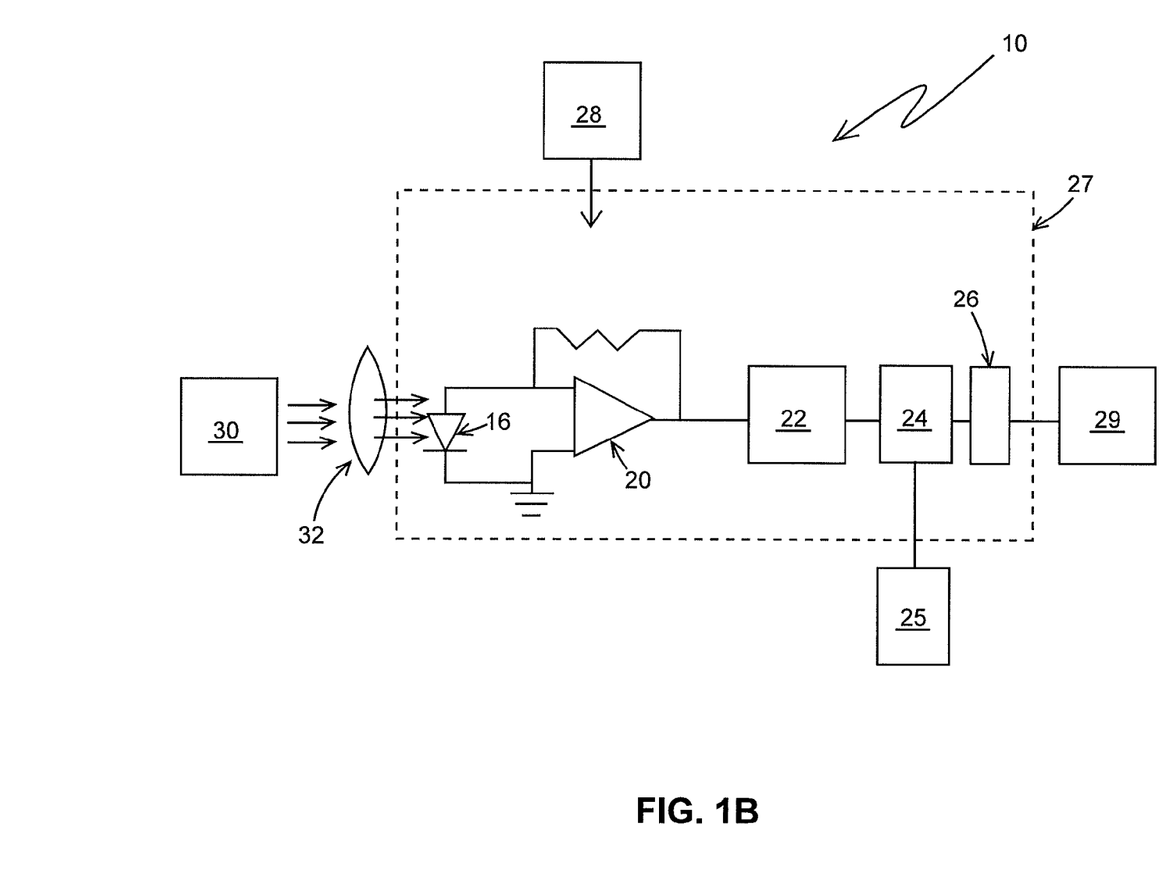
FIG. 1B is a schematic representation of the pixel shown in FIG. 1A, hereof, in which the photodiode is lens coupled to a scintillator receiving radiation or a visible object of interest, which sources of visible radiation are focused by the lens onto all of the pixels in an array of pixels.

Reference will now be made in detail to the present embodiments of the invention, examples of which are illustrated in the accompanying drawings. In the FIGURES, similar structure will be identified using identical reference characters. Turning now to FIG. 1A, a schematic representation of an individual pixel, 10, of an embodiment of the invention is shown. Scintillator pixel, 12, in pixel array, 14, is proximity coupled to single, large area (for increased sensitivity) photodiode, 16, in pixel array, 18, not shown in FIG. 1A. The output of photodiode 16 in response to light from scintillator 12 incident thereon is directed to dedicated amplifier, 20, and then to multiplexed, analog-to-digital converter (ADC), 22, the output of which is directed to first-in-first-out (FIFO) memory buffer, 24, which may be a circular memory buffer, stop-triggered by trigger, 25. As used herein, the term "proximity coupled" means in the vicinity of, including contact between each scintillator pixel and its corresponding photodiode. Photodiode, 16, amplifier 20, ADC 22, memory buffer 24, and output bus, 26, are all compactly mounted on board or card, 27, to which energy is supplied by power supply, 28. Memory readout, 29, samples output bus 26, PCI, IEEE-488, or RS-232, as examples, and generates an image of the source of radiation, not shown in FIG. 1A, from radiation, 30, impinging on array 14. FIG. 1B is a schematic representation of an individual pixel 10 identical to the pixel shown in FIG. 1A, hereof, which is lens coupled, 32, to a scintillator, receiving radiation from projection geometry in an x-ray measurement, or a magnetic lens in a proton radiograph, not shown in FIG. 1B, as examples, or to a visible object of interest, the visible radiation 30 from which sources of visible radiation being focused by lens 32 onto all of the pixels in the array of pixels. Eight, high-bandwidth, eight-channel analog-to-digital converters (ADCs) may be disposed on a single printed circuit board with sixteen such boards forming a module. This architecture facilitates the use of large, inline photodiode-pixels, which are placed on the edge of the board and followed by high-bandwidth, low-noise transimpedance amplifiers. For some applications, the photodiodes are proximity coupled to special-purpose, fast-decaying Cerium-doped Lutetium Oxyorthosilicate (LSO) scintillators. Photodiodes may include avalanche photodiodes, which allow the present imager to operate in a counting mode as opposed to a current mode, and solid-state photomultipliers.

It should be mentioned that in some embodiments of the present continuous imaging system, each scintillator may be light-coupled to a corresponding photodiode by using an optical fiber. Such coupling might be advantageous to shield the photodiodes and associated electronic components in very high radiation situations.

Tight packaging of electronic components behind each pixel may be achieved using a multilayer, bump-bonded printed circuit board. This approach creates a distinct four-edge, abuttable format that permits seamless, 2-D arrays of modules to be created to match specific applications. As an example, long imaging arrays might be used to investigate long-rod penetrators as part of studies of their armor/anti-armor studies, and round arrays might be used to investigate fusion-plasma discharge. The system may be synchronously or asynchronously triggered before, during, or after a transient event by using a built-in, circular memory buffer. Data are continuously collected, which collection may be stopped after an event has occurred. This mode of operation is useful for events having unpredictable, stochastic timing, such as explosive "cook-off" tests and plasma breakdown.

A tungsten casting technology (See, e.g., U.S. Pat. No. 7,141,812 for "Devices, Methods, and Systems Involving Castings".) was used to generate a tight-tolerance pixel matrix 14 for the scintillator pixels. The matrix provides accurate registration within the photodiode arrays, high-Z pixel-to-pixel x-ray scatter shielding, visible light isolation, and a mechanically robust package. The scintillator pixels float inside the matrix under slight compression and without glue, thereby creating increased total-internal-refraction (TIR) light transport within the scintillator itself, which improves system utility and sensitivity, in contrast to glued arrangements. As stated, the scintillator rods are packaged in precision microtomolithographic cells to ensure precise alignment and optimal light transport. LSO scintillators employed are 3.5 mm×3.5 mm×60 mm thick. In one embodiment, the photodiode, amplifier, ADC, memory, and output bus were placed on the same card or board in a 2×32 arrangement with 16 cards yielding 32×32 pixels per block. The modular design allows the removal and replacement of LSO pixels or other components should they become damaged or wear out. Moreover, other scintillator pixels, and mixtures of scintillator pixels may be employed to provide increased sensitivity to various types of radiation to which embodiments of the present invention are to be exposed, depending on the intended application, plastic, organic liquid, NaI, CsI, and Bismuth germinate (BGO) scintillators, being examples.

To increase speed, embodiments of the present invention use a highly parallel architecture in a manner similar to the way a supercomputer uses many thousands of processors. With more than 1,000 channels operating in parallel for each module, the imaging system may simultaneously achieve high-frame rates, as well as any desired number of frames. Whereas a supercomputer uses thousands of parallel processors to simulate a complicated dynamic event, such as an explosion, embodiments of the present imaging system uses thousands of parallel detector channels to rapidly measure the actual events in real time. By coupling individual photodiode pixels to a corresponding scintillator pixel, the present imaging system can image virtually any type of ionization radiation, including x-rays, gamma rays, protons, and neutrons, whereas, by replacing the modular scintillator array with high-speed relay lenses, the photodiode array may be used to image visible-light experiments such as plasma formation and Schlieren photography.

Etendue is the product of area, A, and solid collection angle, $\Omega$. An ordinary camera has a small area and a modest to large solid collection angle, yielding a small to modest étendue. Embodiments of the present pixel arrays have both a large area and a large solid collection angle giving them greater étendue than high-speed cameras. High étendue is important because fast moving objects generally have faint associated signals, and such faint signals may now be collected by imaging systems having high étendue. "Resolution" is generally determined by: (a) field-of-view (which can be changed using lens optics or cone-beam geometry); and (b) the number of pixels (which can be changed by adding pixels). Embodiments of the present invention permit arbitrary resolution, limited by the number and size of pixels which translates into cost. That is, higher resolution may be obtained by increasing the size and number of pixels which increases the cost of the resulting system. Post triggering is accomplished after an event, for example, a lighting bolt. With pre-triggering, a guess must be made as to when the event may occur, whereas with post triggering, the camera continuously takes data and the event may be used to provide a stop trigger for the camera, because the event has occurred and is recorded in memory.

Where ionizing radiation is involved, various configurations are identified hereinabove. For example, a source of particles (protons) may be directed with lenses to expand or contract the image size. For uncharged particles (x-rays and neutrons), a point source may be used along with a "cone beam" (that is, expanding geometry) that permits radiographic magnification to create almost any effective pixel size (at the object) that is desired. Again, the principal limitation is cost. In each situation, having a large photodiode array is an advantage because the system étendue is large. This feature distinguishes the present continuous imaging system over CMOS arrays having z-stacked memory and, although CMOS arrays may ultimately catch up with embodiments of the present invention in physical "speed" and memory, CMOS arrays cannot achieve the large solid collection angle (that is, photographic "speed") of the present continuous imaging system.

Figure 2:
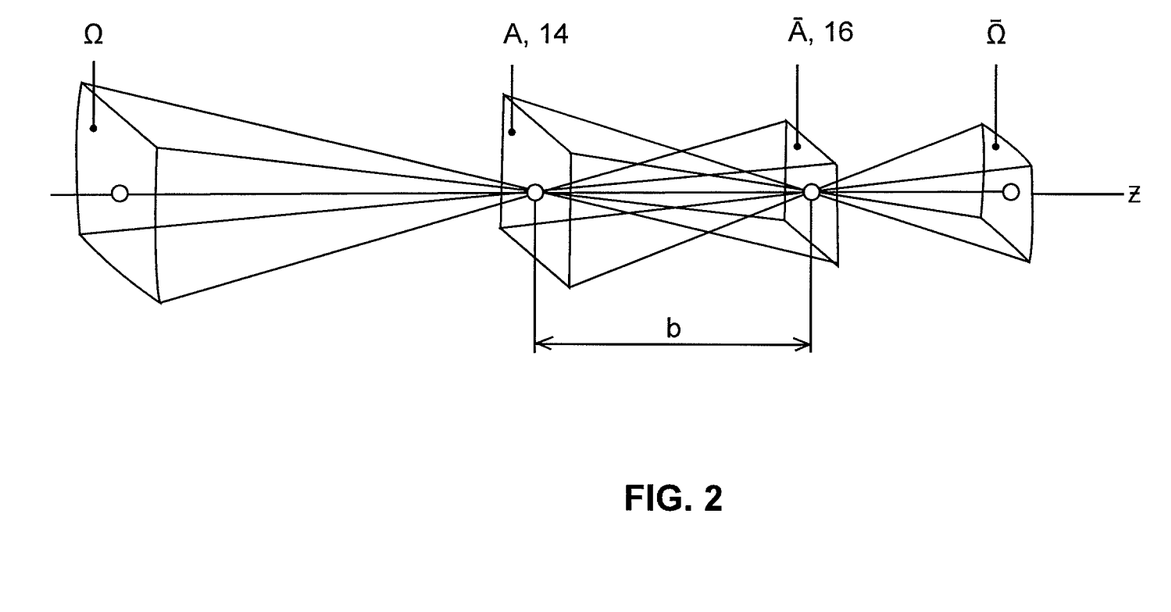
FIG. 2 illustrates the definition of étendue as applied to embodiments of the present invention.

Turning now to FIG. 2, the definition of étendue as applied to embodiments of the present invention is illustrated. "$\overline{\Omega}$" is the numerical aperture of lens 32 (inversely proportional to the f#), "$\overline{A}$" is the photodiode focal plane 16. "A" is the object (not shown in the FIGURES) or scintillator area 14 (either of which may be used), and "$\Omega$" is the lens numerical aperture on the object side (which is different than the numerical aperture of lens 32). Étendue for a perfect system is invariant, so that: $\overline{A}\,\overline{\Omega} = A\Omega$. A larger focal plane area, $\overline{A}$, permits a system to have either: (1) a larger collection solid angle ($\Omega$), which translates into larger efficiency; or (2) a larger image area (A), or some combination of A and $\Omega$. Smaller area detectors must compensate by having a larger solid angle (or lower f#) to achieve reasonable étendue. By contrast, with a large area the f# can be large to achieve a given étendue. It should be mentioned that the proximity-coupled system of FIG. 1A has a similar étendue diagram. A difference is that the scintillator (object) area and the photodiode area are the same and as are the solid angles. In that situation, the solid angle is the critical angle of the scintillators and therefore has the maximum étendue that a system can have. In the lens-coupled configuration, the focal plane area is large which relaxes the requirements on the lens to achieve a given étendue.

Therefore, because pixels are chosen to be large, then, the focal-plane array created has a large collection area, and is correspondingly more sensitive. This increased sensitivity enables embodiments of the present invention to be useful in a large number of applications. Spatial resolution may be modified by increasing the field-of-view, by increasing the radiographic magnification, by increasing the number of modules, or by changing the lens conjugates, or a combination of these procedures.

Embodiments of the present imaging system may then take between 20 and 80 radiographs in 2 µs. With 64 k-deep buffers, a 3 ms hydrodynamic movie is possible. However, up to minutes of 20 MHz movies may be taken with current technology.

Scatter may be eliminated with the application of a small-format Bucky grid. Because scatter ultimately limits the dynamic range of static radiography, such an imaging device could potentially offer an 18-bit dynamic range for static studies where small volume defects are sought in an opaque object.

Having generally described embodiments of the present invention, the following example provides additional details.

EXAMPLE

Figure 3:
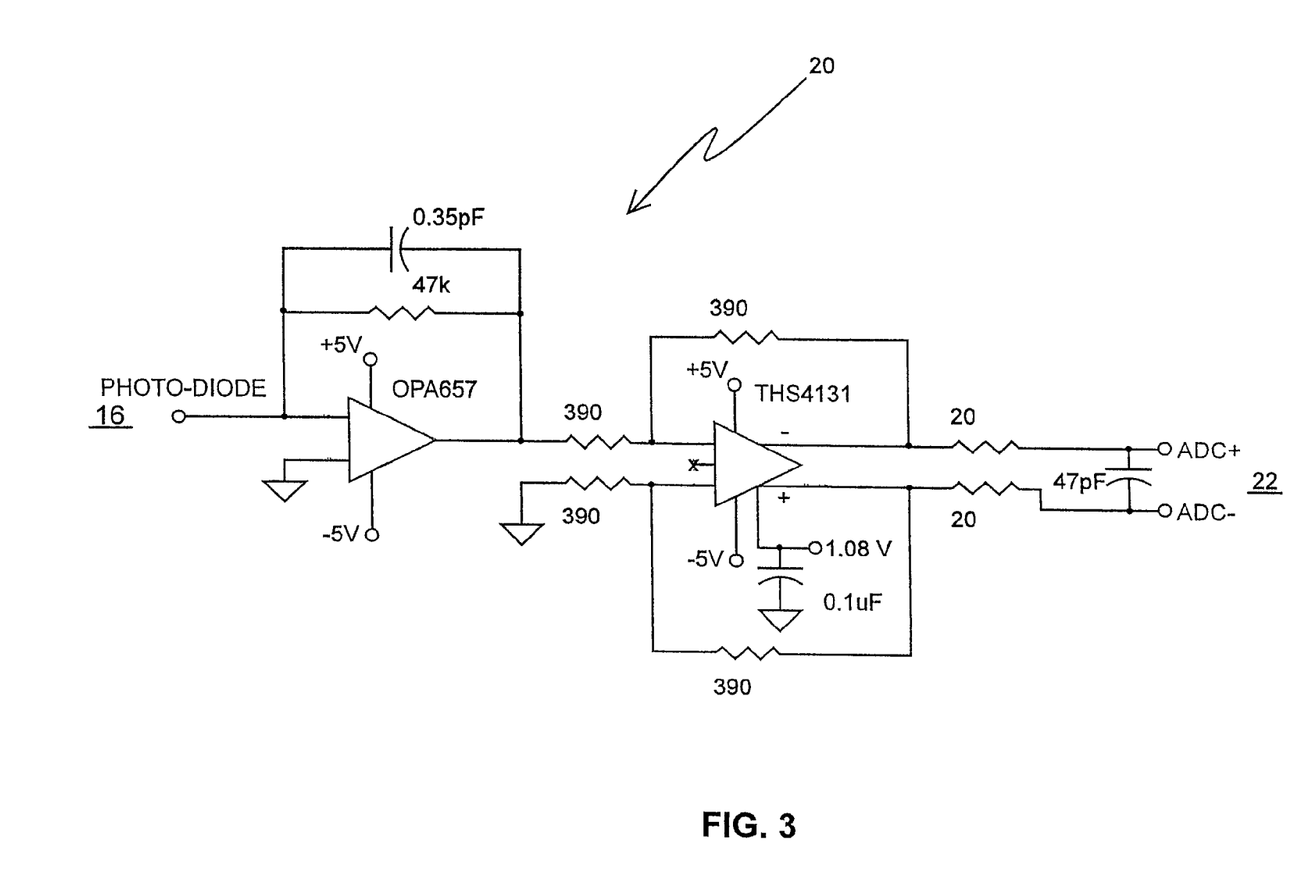
FIG. 3 shows a circuit diagram for an embodiment of the transimpedance amplifier effective for amplifying the current output from the photodiode of FIGS. 1A and 1B, hereof.
Figure 4:
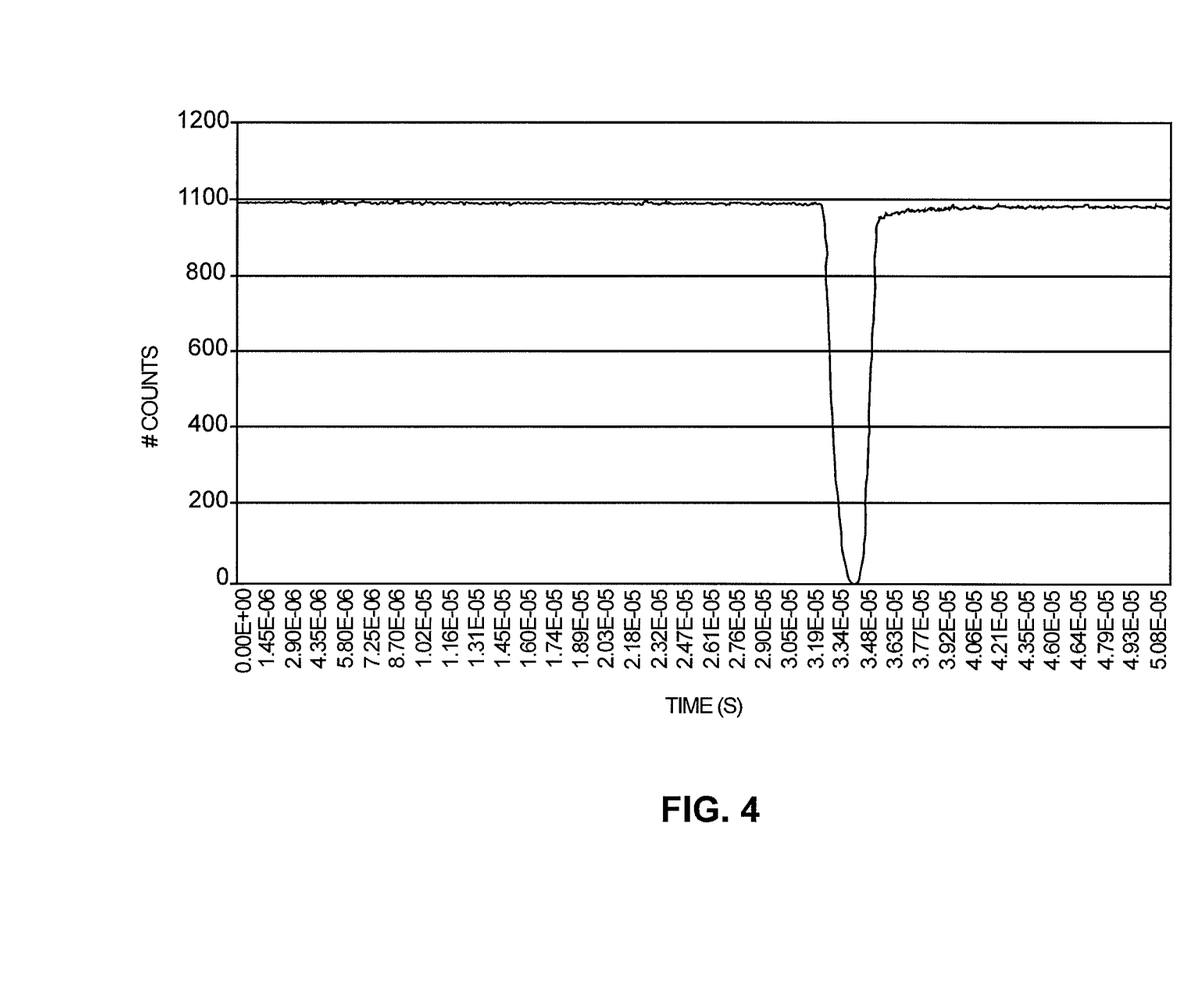
FIG. 4 is a graph of the output from a single photodiode directed into the amplifier of FIG. 3, hereof, for 20 MHz sampling of X-radiation from a 6 MeV Linatron pulse incident on a $Lu_2SiO_5:Ce$ (LSO) scintillator crystal.

To determine the sensitivity of the imager, a 3.6 mm×3.6 mm×50 mm LSO scintillator crystal in optical communication with a 3.6 mm×3.6 mm Hamamatsu S7585 PIN photodiode, the output of which was amplified using the embodiment of the detector board transimpedance amplifier illustrated in FIG. 2 hereof, was irradiated by 6 MeV Bremsstrahlung x-rays from a 6 MeV Linatron pulse sampled at 20 MHz. The amplifier output was transferred to a processor for analysis, a graph of which is shown in FIG. 3, hereof. The sensitivity of the system was found to be approximately 33.4 M rads/s·amp.

With more than a thousand channels operating in parallel on each module, embodiments of the present invention can simultaneously achieve large frame rates and large numbers of frames which permits an almost unlimited frame depth that enables events to be imaged from start to finish. As an example, during an explosive test one can image both the initial detonation and the motion of the resulting fragments. Further, 1 bit of dynamic range is automatically gained for every factor-of-four reduction in frame rate, thereby permitting imaging of slower experiments with higher dynamic range, by taking advantage of the intrinsic tradeoff between bandwidth and dynamic range. By efficiently using every particle, embodiments of the present invention have high quantum efficiency (greater than 50%). Further, since multilayer bump-bonded boards are used to integrate off-the-shelf electronic components, such components may be tightly packaged behind each pixel, giving the invention a distinct four-edge, abuttable format which can be scaled to chosen sizes and shapes.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A continuous imaging system, comprising in combination:
    a plurality of pairs of photodiodes and scintillator pixels arranged such that visible light from each scintillator of said plurality of scintillator pixels is incident on a corresponding photodiode in said plurality of photodiodes;
    a plurality of amplifiers, each amplifier of said plurality of amplifiers being dedicated to one photodiode of said plurality of photodiodes for amplifying the electrical signal generated thereby;
    a plurality of multiplexed analog-to-digital converters, each analog-to-digital converter of said plurality of analog-to-digital converters receiving the amplified electrical signal from at least one amplifier of said plurality of amplifiers, and generating a voltage output therefrom;
    for each of the plurality of multiplexed analog-to-digital converters, at least one first-in-first-out memory buffer for receiving and storing the voltage output from each analog-to-digital converter in a parallel manner;
    an output bus in electrical connection with said memory buffer for receiving stored voltages from said at least one memory buffer; and
    a memory readout for sampling said output bus and for generating an image from the voltages thereof.

2. The continuous imaging system of claim 1, wherein one photodiode, one amplifier dedicated thereto, one analog-to-digital converter, one memory buffer, and one output bus, are disposed on a common circuit board.

3. The continuous imaging system of claim 1, further comprising at least one lens intercepting light incident on said plurality of photodiodes.

4. The continuous imaging system of claim 1, wherein said memory buffer comprises a circular memory buffer.

5. The continuous imaging system of claim 4, wherein said circular memory buffer is post triggered.

6. The continuous imaging system of claim 1, wherein said at least one scintillator in said plurality of scintillators is chosen from: Cerium-doped Lutetium Oxyorthosilicate, plastic, organic liquid, NaI, CsI, and Bismuth germinate scintillators.

7. The continuous imaging system of claim 1, wherein the array of scintillators comprises a tungsten matrix for providing accurate registration within the photodiode array, and high-Z pixel-to-pixel x-ray scatter shielding.

8. The continuous imaging system of claim 7, wherein each scintillator in said array of scintillators is held in said tungsten matrix by compression.

9. The continuous imaging system of claim 1, wherein each scintillator of said plurality of scintillators is proximity coupled to said corresponding photodiode in said plurality of photodiodes.

10. The continuous imaging system of claim 1, further comprising a Bucky grid.

11. The continuous imaging system of claim 1, wherein each of said photodiodes in said plurality of photodiodes comprises an avalanche photodiode.

12. The continuous imaging system of claim 1, wherein each of said photodiodes in said plurality of photodiodes comprises a solid-state photomultiplier.

13. The continuous imager of claim 1, wherein a chosen area of each photodiode in said plurality of photodiode is selected to maximize the etendue of said continuous imager.

14. A continuous imaging system, comprising in combination:
    a plurality of photodiodes disposed in an array having a chosen configuration, each photodiode of said plurality of photodiodes having a chosen area and generating an electrical signal responsive to visible light incident thereon;
    a plurality of scintillator pixels disposed in an array of scintillator pixels, each scintillator pixel of said plurality of scintillator pixels generating visible light in response to radiation incident thereon;
    whereby the visible light from each scintillator pixel of said plurality of scintillator pixels is incident on a corresponding photodiode in said plurality of photodiodes;
    a plurality of amplifiers, each amplifier of said plurality of amplifiers being dedicated to one photodiode of said plurality of photodiodes for amplifying the electrical signal generated thereby;
    a plurality of multiplexed analog-to-digital converters, each analog-to-digital converter of said plurality of analog-to-digital converters receiving the amplified electrical signal from at least one amplifier of said plurality of amplifiers, and generating a voltage output therefrom;

for each of the plurality of multiplexed analog-to-digital converters, at least one first-in-first-out memory buffer for receiving and storing the voltage output from each analog-to-digital converter in a parallel manner;

an output bus in electrical connection with said memory buffer for receiving stored voltages from said at least one memory buffer; and a memory readout for sampling said output bus and for generating an image from the voltages thereof.

15. The continuous imaging system of claim 14, wherein one photodiode, one amplifier dedicated thereto, one analog-to-digital converter, one memory buffer, and one output bus, are disposed on a common circuit board.

16. The continuous imaging system of claim 14, further comprising at least one lens intercepting light incident on said plurality of photodiodes.

17. The continuous imaging system of claim 14, wherein said memory buffer comprises a circular memory buffer.

18. The continuous imaging system of claim 17, wherein said circular memory buffer is post triggered.

19. The continuous imaging system of claim 14, wherein said at least one scintillator in said plurality of scintillators is chosen from: Cerium-doped Lutetium Oxyorthosilicate, plastic, organic liquid, NaI, CsI, and Bismuth germinate scintillators.

20. The continuous imaging system of claim 14, wherein the array of scintillators comprises a tungsten matrix for providing accurate registration within the photodiode array, and high-Z pixel-to-pixel x-ray scatter shielding.

21. The continuous imaging system of claim 20, wherein each scintillator in said array of scintillators is held in said tungsten matrix by compression.

22. The continuous imaging system of claim 14, wherein each scintillator of said plurality of scintillators is proximity coupled to said corresponding photodiode in said plurality of photodiodes.

23. The continuous imaging system of claim 14, further comprising a Bucky grid.

24. The continuous imaging system of claim 14, wherein each of said photodiodes in said plurality of photodiodes comprises an avalanche photodiode.

25. The continuous imaging system of claim 14, wherein each of said photodiodes in said plurality of photodiodes comprises a solid-state photomultiplier.

26. The continuous imager of claim 14, wherein the chosen area of each photodiode in said plurality of photodiode is selected to maximize the etendue of said continuous imager.

* * * * *